United States Patent Office 2,953,298
Patented Sept. 20, 1960

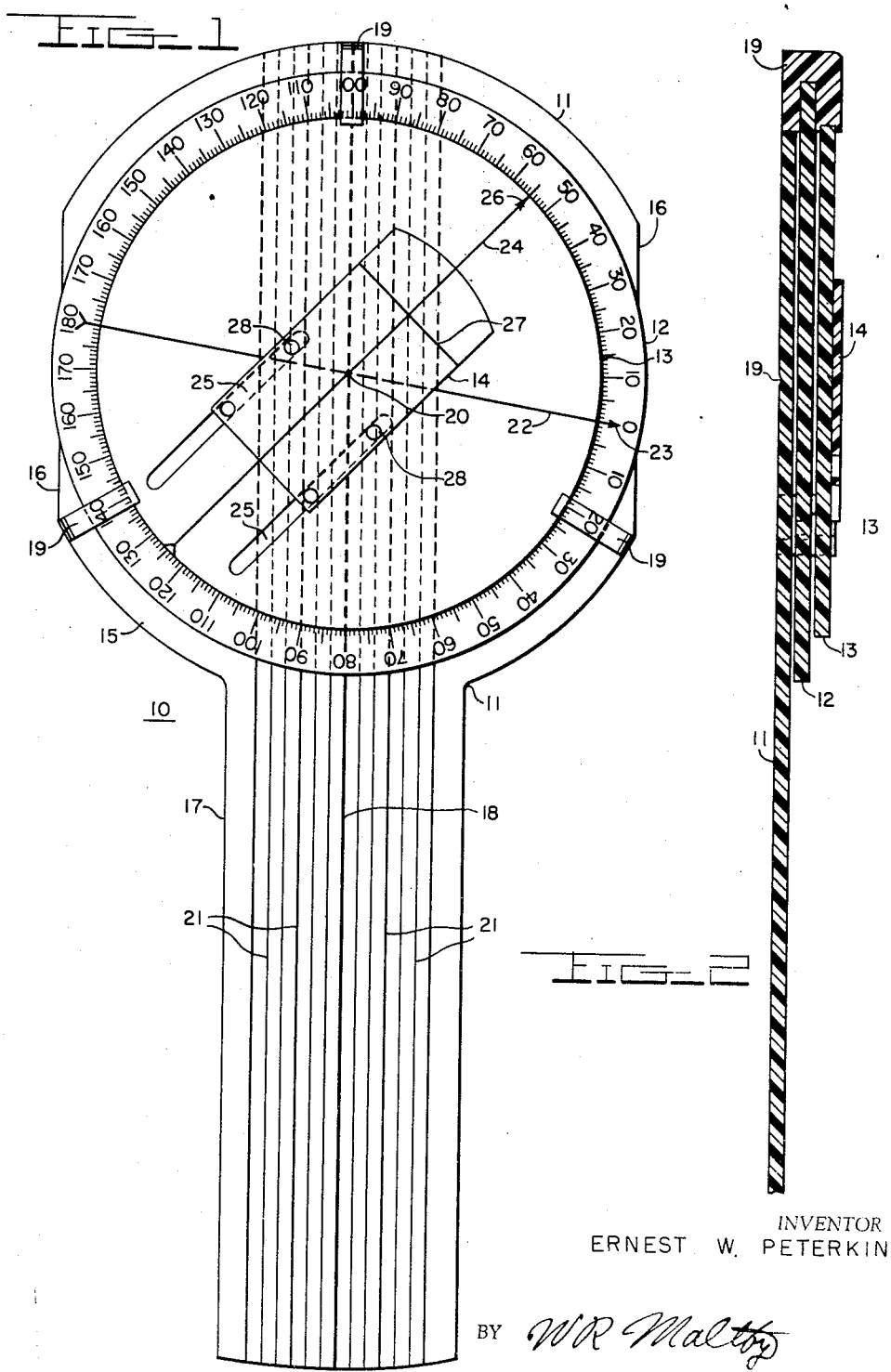

2,953,298

NAVIGATION INSTRUMENT

Ernest W. Peterkin, 406 Woodland Drive,
Forest Heights, Md.

Filed May 31, 1956, Ser. No. 588,589

3 Claims. (Cl. 235—61)

(Granted under Title 35, U.S. Code (1952), sec. 266)

The invention described herein may be manufactured and used by or for the Government of the United States of America for governmental purposes without the payment of any royalties thereon or therefor.

This invention relates in general to navigational instruments and in particular to apparatus for computing interception headings between two objects which are subject to relative motion.

In the navigation of ships and aircraft it is frequently necessary to make computations of relative motion of two objects so that an intercept may be purposely obtained or avoided. The so-called vectoring technique of visual estimation which heretofore has been widely used for such computations provides satisfactory results in many instances; however, it is subject to certain basic limitations. Reasonably accurate results require that determinations be made of several variables such as position, heading, speed of the objects, wind velocity, and the like. These determinations, together with the actual calculations involved in the prior technique, require considerable skill, equipment and are time consuming, disadvantages that are particularly serious where personnel and time are limited.

It is accordingly an object of the present invention to provide a device for determining the presence of an intercept or "collision" course between two bodies subject to relative motion without requiring the measurement of many variable quantities.

Another object of the present invention is to provide a device of simple construction for determining the presence of an intercept or "collision" course between two bodies subject to relative motion without requiring considerable skill and equipment.

Still another object of the present invention is to provide a computer which can be used for high speed airplanes as well as slow speed ships or other type devices to determine relative motion problems so that an intercept may be purposely obtained or avoided.

Other and more specific objects of this invention will become apparent upon a careful consideration of the following detailed description when taken together with the accompanying drawings, in which Fig. 1 illustrates a plan view of the complete computer, and Fig. 2 is a sectional view of the computer taken along the center line of Fig. 1.

In accordance with the teachings of the present invention, a navigation instrument is provided for determining whether or not the relative motion of two objects is likely to result in intercept. This instrument successfully avoids undue structural complications and dispenses with requirements for actual determinations of the magnitudes of many variable quantities.

The apparatus of the present invention is intended for use in conjunction with an object locating device presenting a form of area-type signal presentation such as a radar set with a plan position indicator. The computer is associated with the PPI at a central intelligence receiving station to determine the proper direction of travel between two objects in an area in order to cause intercept or avoidance thereof. The proper instructions for guidance or control of an object for intercept or avoidance is transmitted to the interceptor from the central station. The computer is a separate instrument which is used in conjunction with a PPI scope only when guidance and instructions are necessary. The computer comprises parts which are rotated relative to each other in accordance with the position of two objects appearing on a PPI scope and by proper rotation of the respective parts, motion headings can be obtained which will result in intercept or avoidance of intercept.

The computer solution is independent of target velocity or course, interceptor velocity, PPI range scale, or wind direction and the device can be made of plastic or any transparent material of any size to fit the scope that is being used. For example, a 5 in. diameter base plate device can be used on a 5 in. scope, however; under certain circumstances it may be desirable to place a computer of greater width over a 5 in. scope to operate at very short PPI range scales. The wind direction, velocity, etc., of the respective objects are taken into account automatically by time lapse and travel direction of the objects as they appear on the PPI scope and as the target moves a distance equal to a particular parallel line of the computer.

Referring now to the drawings wherein like reference characters represent like parts throughout, the computer 10, as illustrated, comprises a flat surface base plate 11 having a circular end portion 15 and an elongated radial extension 17 of selected width, a heading dial or disc 12, and a heading correction dial or disc 13, each of different diameter and having a common axis with the circular end portion of the base plate. The discs are independently movable and are held in position relative to the base plate by three equally spaced dial hangers 19 about the circumference of the circular end portion. The heading correction dial 13 has a vector slide 14 movably secured thereon within two linear slots 25 in the surface thereof.

The flat surface base plate 11 is of one piece with the circular end portion 15 cut away at 16 on opposite sides parallel with the axis of the radial extension 17 to aid in rotating the disc 12 secured thereto. Engraved into one surface of the base plate is a centrally disposed heavy black base line 18 and for illustrative purposes twelve additional equally spaced parallel lines 21, six on each side of the base line, extending the length of the radial extension and across the circular end portion. Every third line from the base line is heavier than those intervening for better viewing and for simplification of operation. The common axis of the device is emphasized by a countersunk hole 19 in the bottom of the base plate which is centrally disposed in the circular end portion 15 along line 18.

The heading dial 12 is circular, having a diameter smaller than and positioned above the circular end portion 15 of the base plate. The dial is calibrated along the outer edge on its upper surface in one degree intervals to 180° on opposite sides of 0; wherein 0° is at the tip 23 of an arrow 22 engraved into a surface of the dial.

The heading correction dial 13 is positioned above the heading dial and has a smaller diameter than the latter. An arrow 24, having a tip 26, is engraved into a surface through the axis and colored a different color, from the arrow 22 on the heading dial 12. The heading correction dial 13 has two parallel linear slots 25 therein on opposite sides of the arrow and equally spaced therefrom. The slots lie wholly in one half of the correction dial with the inner-most ends lying along an imaginary line through the axis, and the slots extend toward the outer edge surface of the heading correction dial. A movable vector slide 14 is secured to the surface of the heading correction dial as by four rivets 28 which slide within the slots 25 such that the vector slide can move linearly along the arrow 24. Two of the rivets are secured in the end of the vector slide away from the arrow tip 26 whereby a line 27 engraved in the opposite end of the vector slide and perpendicular to the arrow, will be approximately along a line through the axis of the device. The other two rivets are secured inwardly in the opposite end of the slide in a position whereby the rivets will contact the inner-most end of the slots to limit the line 27 on the vector slide to lie beyond the outermost parallel line 21 on the surface of the base plate; i.e., when the arrow 24 is positioned perpendicular to the lines 21.

In operation of the device, for example, the determination of a collision course between a target (x) and an interceptor (y), two blips appearing as the target and interceptor are noted on a PPI scope, the computer device is placed over the two blips with the axis or center line 20 of the circular end portion of the base plate directly over the interceptor (y) and the heavy black line 18 over the target (x). The base plate is fixed in this position and the motion of the interceptor (y) is observed. The heading dial 12 is rotated until the arrow 22 falls directly over the path of the interceptor (y) with the arrow head 23 pointing in the direction that the interceptor is moving. With the heading dial 12 held in position the heading correction dial 13 is rotated until the arrow tip 26 is directly over arrow 22 on the heading dial 12. Motion of the target (x) is then observed. When the target position has moved from its original position on the heavy black line 18 to any one of the parallel lines 21, the vector slide 14 is moved along the slots 25 and arrow 24 until the line 27 on the vector slide intersects with the arrow 22 directly over the position of the interceptor blip (y). Without rotating the heading dial 12 or sliding the vector slide 14, the heading correction dial 13 is then rotated until the intersection of line 27 and arrow 24 of the correction dial intersects with the same parallel line on the base plate to which the target (x) is observed. The reading at the tip 26 of the heading correction dial arrow 24 in degrees on either side of the heading dial tip 23 is the number of degrees that the interceptor must change course in that direction in order to intercept the target. After having determined the heading correction for the interceptor the computer can be removed from the PPI scope and the information can be radioed to the interceptor as to the correct direction to head in order to make an intercept.

The above procedure can be carried out for aircraft to aircraft, aircraft to ship, and ship to submarine interception or any other objects having relative motion provided the direction and speed of the objects are such that an interception is possible. It can be seen that the same method can be used to determine a safe course to follow between two objects, having relative speeds and direction, to prevent a collision or damage to one or both. Relative speeds of the two moving objects may change over a period of time, in this case, additional solutions can be made from later positions of the two objects.

Obviously many modifications and variations of the present invention are possible in the light of the above teaching. It is therefore to be understood, that within the scope of the appended claims, the invention may be practiced otherwise than as specifically described.

What is claimed is:

1. A computing device adapted to be used in conjunction with a plan position indicator for determining interceptor headings between two objects subject to relative motion indicated on the plan position indicator comprising a transparent base plate having a circular end portion and an elongated radial extension of selected width, said base plate having parallel lines marked on the flat surface thereof extending the length of said radial extension and across the circular end portion, first and second transparent circular dials having respectively smaller diameters mounted on the end portion of said base plate and independently movable for 360 degree rotation about a common axis with respect thereto, and a transparent vector slide secured to said second circular dial, said vector slide being linearly movable along a line through the axis of said second circular dial relative to said parallel lines on said base plate.

2. The features as claimed in claim 1, wherein the outer boundary of said first dial is circularly calibrated for 0–180 degrees on opposite sides of a reference point, and said second dial has an arrow through the axis and extending to one edge thereof.

3. A computing device adapted to be used in conjunction with a plan position indicator for determining a collision course between two objects in relative motion indicated on the plan position indicator which comprises a transparent flat base member having a circular end portion and an elongated radial extension of selected width, said flat base member containing a base reference line through the axis of said circular end portion and extending the length of said radial extension, a plurality of equally spaced parallel lines on opposite sides of said base reference line, first and second transparent discs having respectively smaller diameters, said discs being secured and positioned on said circular end portion of said base member and independently movable for 360 degree rotation about a common axis thereto, said first disc having an arrow extending through the axis thereof from one edge of the disc to the other edge with the tip of the arrow at zero degrees and circularly calibrated for 0–180 degrees along the boundary thereof on opposite sides of the tip, said second disc having an arrow extending from one edge through the axis to the other edge and a transparent vector slide member movably secured on the surface of said second disc in one semi-circular portion thereof and linearly movable parallel to the arrow on the surface relative to said equally spaced parallel lines on said base member.

References Cited in the file of this patent

UNITED STATES PATENTS

| | | |
|---|---|---|
| 1,098,621 | Gist | June 2, 1914 |
| 1,984,390 | Wright | Dec. 18, 1934 |
| 2,425,097 | Isom | Aug. 5, 1947 |
| 2,438,730 | Watter | Mar. 30, 1948 |

OTHER REFERENCES

Weems: "Air Navigation," second edition, McGraw-Hill, 1938, page 162 relied on.

"Electrical Engineering," volume 71, No. 4, April 1952. "Navigational Crystal Ball."